Jan. 22, 1935.   A. B. MERRILL ET AL   1,988,604
LINEMAN'S PROTECTIVE SLEEVE AND METHOD OF MAKING THE SAME
Filed May 13, 1931

Inventors
Allan B. Merrill
Chalmer C. Curtis
By Eakin & Avery
Attys

Patented Jan. 22, 1935

1,988,604

UNITED STATES PATENT OFFICE 1,988,604

LINEMAN'S PROTECTIVE SLEEVE AND METHOD OF MAKING THE SAME

Allan B. Merrill, Akron, and Chalmer C. Curtis, Cuyahoga Falls, Ohio, assignors to The B. F. Goodrich Company, New York, N. Y., a corporation of New York Application May 13, 1931, Serial No. 537,180

5 Claims. (Cl. 173—28)

This invention relates to devices for protecting linemen from high-tension wires and its chief objects are effective protection, prevention of dangerous migration of water into the device, ease of application, security against accidental displacement of the device, and economy of manufacture.

Figure 1:
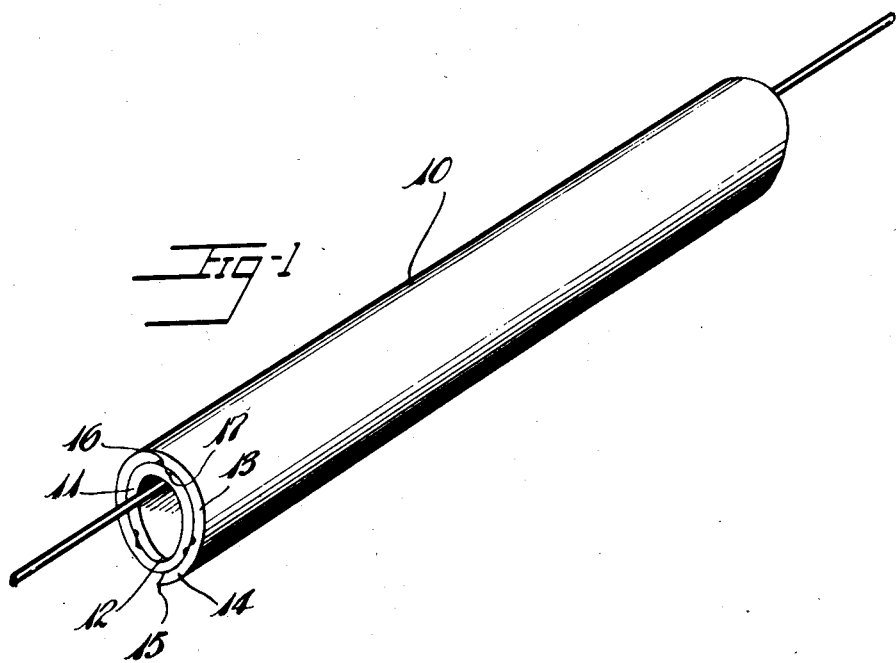
Fig. 1 is a perspective view of a portion of a wire and, mounted thereon, a protective sleeve embodying our invention in its preferred form.

Referring to the drawing, the sleeve, 10, is of volute or spiral form, is of flexible, dielectric material, preferably rubber, and preferably is so formed that each convolution will be caused, by the resilience of the material to lie close to, and preferably in contact with, the next.

The sleeve preferably is of elongated form in cross-section, so that when it is properly mounted upon the wire rotation of the sleeve will be resisted by gravity. The innermost convolution, 11, preferably terminates in a longitudinal margin 12 lying in the lower part of the sleeve when the sleeve is properly mounted upon the wire, so that water reaching that margin would still be far from the wire, and the outer convolution, 13, preferably terminates in a longitudinal margin 14 at the bottom of the exterior of the sleeve, so that the contacting surfaces of it and the underlying convolution lead upward, against gravity, for resistance to migration of water, and so that water on said margin will be drawn by gravity away from and not toward the underlying convolution.

The said margin preferably is formed with an acute longitudinal drip lip 15 for effective removal of water therefrom by gravity.

Figure 2:
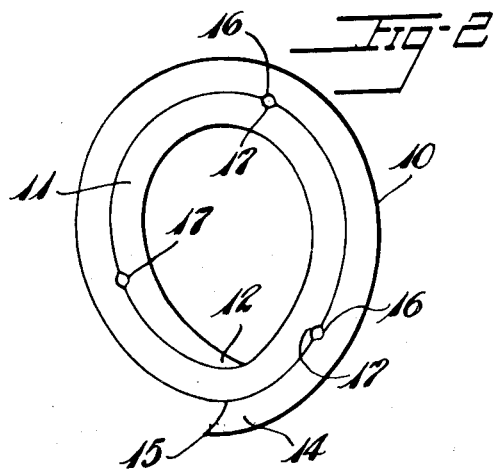
Fig. 2 is an end elevation of the device.

To interrupt capillary attraction between convolutions the convolutions preferably are formed with half-circle, longitudinally disposed recesses as at 16, 17, which may mate as shown in Fig. 2 or may occupy circumferentially offset positions as in Fig. 1, the said recesses providing reservoirs and discharge channels for moisture accumulated in them by capillary attraction, surface migration or otherwise as well as to interrupt the capillary attraction.

The sleeve preferably is manufactured by wrapping a semi-cured sheet of rubber upon a suitable mandrel with a thin sheet of non-adhesive material or liner interposed between the convolutions, wrapping the assembly with a fabric wrapper, and further vulcanizing the spiral wrapping of rubber.

In so producing the sleeve the drip lip 15 may be provided either by cutting away a portion of the margin of the sleeve after vulcanization or by employing a suitable forming member between the sleeve and the wrapping during vulcanization.

The recesses 16, 17 may be formed either by abrading or cutting the sleeve after vulcanization or by employing suitable molding members in addition to or as a part of the "liner" during vulcanization.

The sleeve is mounted by so rotating it about the wire as to cause the wire to pass between its convolutions into its interior, and is dismounted by the reverse operation.

We claim:

1. A lineman's protective sleeve adapted to be detachably mounted upon an electrical conductor, said sleeve comprising a sheet of resilient, dielectric material having when in unstrained condition a spiral form of substantially more than one turn and of elongated cross-sectional form.

2. The method of making a lineman's protective sleeve which comprises winding a sheet of rubber composition upon a mandrel with a liner, and wrapping and vulcanizing the sheet, the sheet being formed with an external drip lip.

3. The method of making a lineman's protective sleeve which comprises winding a sheet of rubber composition upon a mandrel with a liner, and wrapping and vulcanizing the sheet, the sheet being formed with a recess for interrupting capillary attraction.

4. The method of making a lineman's protective sleeve which comprises winding a sheet of rubber composition upon a mandrel with a liner, and wrapping and vulcanizing the sheet, the sheet being formed with an external drip lip and a recess to interrupt capillary attraction.

5. The method of making a lineman's protective sleeve which comprises partially vulcanizing a sheet of rubber composition, winding it upon a mandrel with a liner, wrapping the assembly, vulcanizing it, and removing the liner, mandrel and wrapper to provide a sleeve having, in its unstrained condition, surfaces in juxtaposition.

ALLAN B. MERRILL.
CHALMER C. CURTIS.